United States Patent
Balea et al.

(10) Patent No.: US 10,132,222 B2
(45) Date of Patent: Nov. 20, 2018

(54) EXHAUST AFTERTREATMENT SYSTEM, APPARATUS, AND METHOD

(71) Applicant: Caterpillar Inc., Peoria, IL (US)

(72) Inventors: Bogdan Balea, Peoria, IL (US); Eric P. Spaeth, Pekin, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/369,416

(22) Filed: Dec. 5, 2016

(65) Prior Publication Data

US 2018/0156094 A1 Jun. 7, 2018

(51) Int. Cl.
| | |
|---|---|
| *F01N 3/10* | (2006.01) |
| *F01N 3/28* | (2006.01) |
| *F01N 3/20* | (2006.01) |
| *F01N 13/08* | (2010.01) |
| *F01N 3/021* | (2006.01) |
| *B01D 53/94* | (2006.01) |
| *B01D 46/00* | (2006.01) |

(52) U.S. Cl.
CPC ....... *F01N 3/2892* (2013.01); *B01D 53/9418* (2013.01); *B01D 53/9431* (2013.01); *B01D 53/9436* (2013.01); *F01N 3/021* (2013.01); *F01N 3/2066* (2013.01); *F01N 13/08* (2013.01); *B01D 46/0041* (2013.01); *B01D 2279/30* (2013.01); *F01N 2470/00* (2013.01)

(58) Field of Classification Search
CPC ...... F01N 2240/20; F01N 3/28; F01N 3/2892; F01N 3/2066; B01F 5/0682
USPC ........................................................ 422/176
See application file for complete search history.

(56) References Cited

U.S. PATENT DOCUMENTS

| | | | | |
|---|---|---|---|---|
| 3,644,098 A | * | 2/1972 | De Palma | F01N 3/2846 213/5 |
| 3,852,042 A | * | 12/1974 | Wagner | F01N 3/2853 422/176 |
| 4,002,433 A | * | 1/1977 | Oser | F01N 3/2853 422/176 |
| 4,209,495 A | | 6/1980 | Kobayashi et al. | |
| 6,368,658 B1 | * | 4/2002 | Schwarz | A61L 27/28 427/2.15 |
| 6,712,869 B2 | | 3/2004 | Cheng et al. | |
| 8,539,761 B2 | | 9/2013 | Lebas et al. | |
| 8,745,979 B2 | | 6/2014 | Sedlacek et al. | |
| 9,097,161 B2 | | 8/2015 | Vanvolsem et al. | |
| 2006/0008397 A1 | | 1/2006 | Bruck | |
| 2011/0107750 A1 | * | 5/2011 | Kowada | B01D 53/944 60/299 |
| 2012/0151902 A1 | | 6/2012 | Yi et al. | |

(Continued)

FOREIGN PATENT DOCUMENTS

| | | |
|---|---|---|
| EP | 1704308 A1 | 9/2006 |
| WO | WO 2010/133412 A2 | 11/2010 |
| WO | WO 2015/091242 A1 | 6/2015 |

*Primary Examiner* — Tom P Duong
(74) *Attorney, Agent, or Firm* — Oblon, McClelland, Maier & Neustadt (57) ABSTRACT

A component of the exhaust aftertreatment system includes a metallic body having a tapered portion. The component of the exhaust aftertreatment system further includes a curved plate arranged within the tapered portion of the metallic body. The curved plate has a plurality of perforations disposed on the curved plate to facilitate distribution of an exhaust mixture flowing through the curved plate across a surface of a substrate.

15 Claims, 7 Drawing Sheets

(56) References Cited

U.S. PATENT DOCUMENTS

2014/0116037 A1\* 5/2014 Lebas ................ B01F 3/04049
60/324
2015/0361852 A1 12/2015 Nagata et al.

\* cited by examiner

EXHAUST AFTERTREATMENT SYSTEM, APPARATUS, AND METHOD

TECHNICAL FIELD

The present disclosure relates to an exhaust aftertreatment system.

BACKGROUND

An exhaust aftertreatment system (ATS) is associated with an engine of a machine. Typically, the exhaust ATS of the engine is coupled to an exhaust gas pipe of the engine at an inlet port defined on a housing of the exhaust ATS. The exhaust ATS treats and reduces oxides of nitrogen (NOx) and unburnt hydrocarbons present in exhaust gas flow, prior to the exhaust gas flow exiting to atmosphere. The exhaust ATS includes an exhaust substrate, such as a Diesel Oxidation Catalyst (DOC), for treating and reducing the unburnt hydrocarbons present in the exhaust gas, and promoting the oxidation of NO to $NO_2$.

Typically, a distance between the inlet port defined in the housing and the exhaust substrate disposed within the housing may be large enough to provide adequate flow uniformity before the exhaust gas impinges upon a face of the exhaust substrate. Design restrictions may result in less available space for the exhaust ATS, and hence the distance between the inlet port and the face of the exhaust substrate may have to be reduced. However, reducing the distance between the inlet port and the face of the exhaust substrate may affect uniformity of the exhaust gas flow and may further degrade performance of the exhaust ATS.

US Patent Publication number US 2012/0151902 discloses a biased reductant mixer for an engine exhaust aftertreatment system. The biased reductant mixer assists in an introduction and conversion of a reductant introduced by an injector. According to the '902 patent publication, a contact area of the biased reductant mixer may be varied so as to provide a greater impingement region for a reductant spray to hit against and cause the reductant spray to break up so as to create more turbulence and further help in conversion of the reductant spray into ammonia.

SUMMARY OF THE DISCLOSURE

In one aspect of the present disclosure, an exhaust aftertreatment system is provided. The exhaust aftertreatment system includes an exhaust inlet configured to receive an exhaust mixture through an inlet port. The exhaust inlet includes a tapered portion between a first portion connecting the tapered portion to the inlet port and a second portion connecting the tapered portion to a canister of an exhaust substrate. The exhaust aftertreatment system further includes a diffuser arranged within the tapered portion of the exhaust inlet. The diffuser includes a diffuser plate forming a wall between the first portion and the second portion. The diffuser plate has a curved surface that is convex toward an inlet surface of the canister of the exhaust substrate. A plurality of perforations are disposed in the curved surface of the diffuser plate through which the exhaust mixture is allowed to pass from the inlet port to the exhaust substrate. The plurality of perforations distribute a portion of the exhaust mixture radially outward across the inlet surface of the canister of the exhaust substrate based on the curved surface of the diffuser plate. The exhaust aftertreatment system further includes an exhaust outlet connected to an outlet of the canister of the exhaust substrate. The exhaust outlet is configured to discharge a treated exhaust mixture from the exhaust substrate through an outlet port. The exhaust outlet includes an outlet pipe bent toward the exhaust inlet resulting in the outlet port facing the curved surface of the diffuser plate.

In another aspect of the present disclosure, a method is provided. The method includes providing an exhaust component of an exhaust aftertreatment system. The exhaust component has a tapered portion between a first portion and a second portion connecting an inlet port to a canister of an exhaust substrate. The method further includes providing a curved plate arranged within the tapered portion of the exhaust component forming a wall between the first portion and the second portion. The curved plate is convex toward the canister of the exhaust substrate and includes a plurality of perforations disposed on the curved plate through which an exhaust mixture flows from the inlet port to the exhaust substrate. The method further includes providing an outlet component of the exhaust aftertreatment system. The outlet component includes an outlet port to discharge a treated exhaust mixture.

In yet another aspect of the present disclosure, a component of an exhaust aftertreatment system is provided. The component of the exhaust aftertreatment system includes a metallic body having a tapered portion. The component of the exhaust aftertreatment system further includes a curved plate arranged within the tapered portion of the metallic body. The curved plate has a plurality of perforations disposed on the curved plate to facilitate distribution of an exhaust mixture flowing through the curved plate across a surface of a substrate.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments of the disclosed subject matter, and, together with the description, explain various embodiments of the disclosed subject matter. Further, the accompanying drawings have not necessarily been drawn to scale, and any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, well-known structures and components may be shown in block diagram form in order to avoid obscuring the concepts of the described subject matter. Wherever possible, the same reference numbers will be used throughout the drawings to refer to the same or the like parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, embodiments of the disclosed subject matter can uniformly distribute an exhaust mixture across an inlet surface of a canister of an exhaust aftertreatment system containing an exhaust substrate, such as Diesel Oxidation Catalyst (DOC), a Selective Catalytic Reduction (SCR) system, and/or a Diesel Particulate Filter (DPF) by shortening a distance between an inlet port of an exhaust inlet and the inlet surface of the canister. The exhaust inlet has a straight portion and a tapered portion. The tapered portion aids in achieving a uniform flow of an exhaust mixture, coming from an engine, before the exhaust mixture impinges on the inlet surface of the canister. A curved plate having a plurality of perforations is arranged within the tapered portion of the exhaust inlet for facilitating uniform flow of the exhaust mixture. The curved plate has a curved surface and is convex toward the inlet surface of the canister. The plurality of perforations includes a plurality of small perforations and a plurality of large perforations arranged in an asymmetric pattern. The tapered portion, curvature of the curved plate, and the plurality of perforations aid in maintaining the uniform flow of the exhaust mixture across the inlet surface of the canister irrespective of an orientation or configuration of an inlet pipe coupling the engine with the inlet port of the exhaust inlet.

Figure 1:
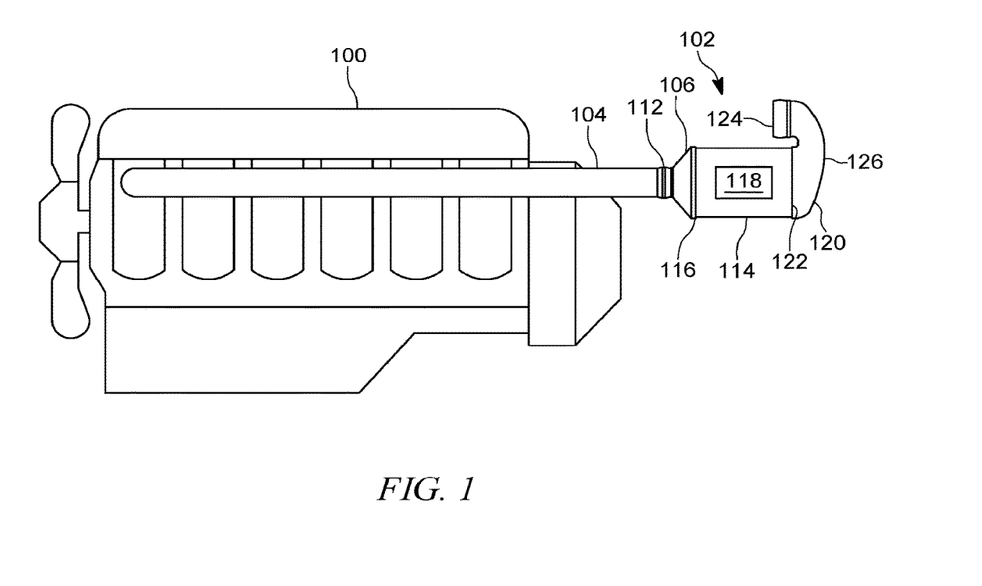
FIG. 1 is a schematic block diagram of an engine and an exhaust aftertreatment system coupled to the engine according to one or more embodiments of the present disclosure.

Referring to FIG. 1, a schematic block diagram of an engine 100 and an exhaust aftertreatment system 102 coupled to the engine 100 is illustrated, according to one or more embodiments of the present disclosure. The engine 100 may be used to provide power to any machine including, but not limited to, an on-highway truck, an off-highway truck, an earth moving machine, and an electric generator. Accordingly, the engine 100 may be associated with an industry including, but not limited to, transportation, construction, agriculture, forestry, power generation, and material handling. In an embodiment, the engine 100 may be an internal combustion, such as a spark ignition engine or a compression ignition engine, operated on fuels such as diesel, gasoline, a gaseous fuel, or a combination thereof. The engine 100 may include multiple cylinders defined in various configurations such as 'V' type configuration and in-line configuration. The engine 100 may further include various components (not shown), such as a fuel system and an intake system.

The engine 100 may further include an exhaust manifold (not shown). The exhaust manifold may receive an exhaust mixture exiting the multiple cylinders of the engine 100. The exhaust mixture can contain emission compounds that may include, but not limited to, oxides of nitrogen (NOx), unburnt hydrocarbons, particulate matter, and other combustion byproducts. In order to treat the exhaust mixture and reduce the emission compounds prior to exiting into atmosphere, the exhaust manifold of the engine 100 is coupled to the exhaust aftertreatment system 102 via an inlet pipe 104. The inlet pipe 104 aids in fluid communication of the exhaust manifold of the engine 100 with the exhaust aftertreatment system 102.

The exhaust aftertreatment system 102 may include a component 106, which is, hereinafter, interchangeably referred as "the exhaust inlet 106" or "the exhaust component 106," coupled to the inlet pipe 104. The exhaust inlet 106 may be a metallic body 108 (shown in FIG. 2) made from a metal or an alloy, such as steel. The exhaust inlet 106 may include an inlet port 110 (shown in FIG. 2) defined at a first end 112 of the exhaust inlet 106, as shown in FIG. 1. The exhaust manifold may be coupled, via the inlet pipe 104, to the inlet port 110 of the metallic body 108 of the exhaust inlet 106. During operation of the engine 100, the exhaust aftertreatment system 102 receives the exhaust mixture from the engine 100 through the exhaust manifold and the inlet port 110 of the exhaust inlet 106.

The exhaust aftertreatment system 102 may further include a canister 114 disposed downstream of the inlet port 110 of the exhaust inlet 106. The canister 114 may be further coupled to a second end 116 of the metallic body 108 of the exhaust inlet 106. The canister 114 may be coupled with the exhaust inlet 106 in such a way that a fluid tight connection is provided between the canister 114 and the exhaust inlet 106, and hence leakage of the exhaust mixture may be prevented. In one embodiment, the canister 114 may be fastened to the metallic body 108 of the exhaust inlet 106 using fasteners such as bolts and nuts. In another embodiment, the canister 114 may be welded to the exhaust inlet 106. In yet another embodiment, the canister 114 may be press fitted with the second end 116 of the exhaust inlet 106. The canister 114 can be a hollow cylindrical body having a predefined inner volume, and may receive an exhaust substrate 118 within the predefined inner volume of the hollow cylindrical body. The exhaust substrate 118 may be arranged within the canister 114 to receive the exhaust mixture from the exhaust manifold of the engine 100 via the inlet port 110. The exhaust substrate 118 can be used to reduce the emission compounds present in the exhaust mixture. Further, in the case of the DPF, as the exhaust mixture passes through the exhaust substrate 118, particulate matter contained in the exhaust mixture may be trapped and prevented from being emitted to the atmosphere.

In some embodiments, the exhaust aftertreatment system 102 may include a reductant system (not shown) for injecting or spraying a reductant onto the exhaust mixture by a reductant injector. In an example, the reductant may be a Diesel Exhaust Fluid (DEF). In other examples, the reductant may include urea, ammonia, and other suitable reducing agents.

The exhaust substrate 118 of the exhaust aftertreatment system 102 may treat and treat the exhaust mixture received from the engine 100. One example of treating the exhaust mixture is filtering, such as in the case of the DPF. The treated exhaust mixture may be further introduced toward an exhaust outlet 120 of the exhaust aftertreatment system 102. The exhaust outlet 120 may be connected to an outlet 122 of the canister 114 and discharges the treated exhaust mixture from the exhaust substrate 118 to the atmosphere through an outlet port 124. The exhaust outlet 120 may include an outlet pipe 126 bent toward the exhaust inlet 106, as shown in FIG. 1. In one embodiment, the outlet pipe 126 can be manufactured from stamped or laser-cut sheet metal and can be welded to the canister 114. In another embodiment, the outlet pipe 126 may be fastened to the canister 114 using fasteners such as bolts and nuts. In yet another embodiment, the outlet pipe 126 may be manufactured using any material that is able to withstand high temperature caused by the exhaust mixture within the exhaust aftertreatment system 102. The exhaust aftertreatment system 102 disclosed herein is a non-limiting example. It will be appreciated that the exhaust aftertreatment system 102 may be disposed in various arrangements and/or combinations relative to the exhaust manifold.

Figure 2:
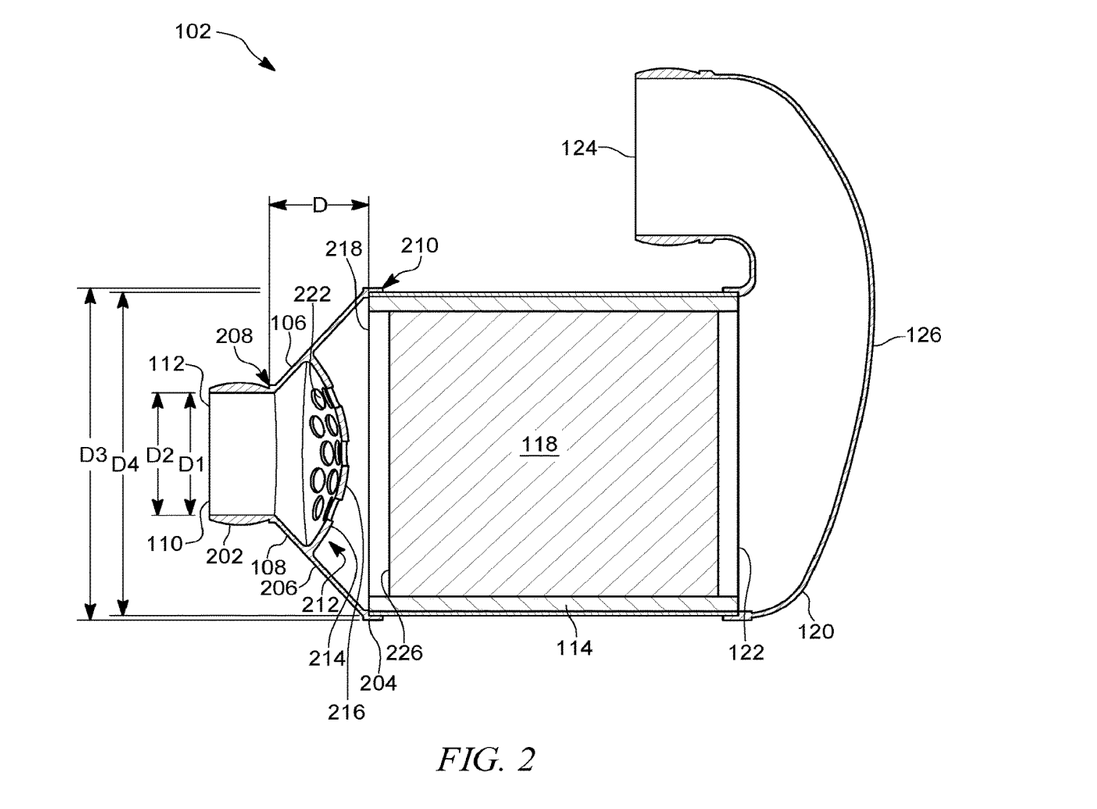
FIG. 2 is a cross-sectional view of the exhaust aftertreatment system of FIG. 1 showing a curved plate, according to one or more embodiments of the present disclosure.

FIG. 2 illustrates a cross-sectional view of the exhaust aftertreatment system 102 according to one or more embodiments of the present disclosure. The exhaust aftertreatment system 102 may include the inlet port 110 that has an inlet diameter "D1" defined at the first end 112 of the metallic body 108 of the exhaust inlet 106. In an alternate embodiment, the inlet port 110 can be defined anywhere accessible on the exhaust aftertreatment system 102, without deviating from the scope of the present disclosure. In order to provide a fluid tight communication between the exhaust manifold and the exhaust aftertreatment system 102, in one embodiment, the inlet diameter "D1" of the inlet port 110 may be made equal to an inner diameter of a end port (not shown) of the inlet pipe 104 coupled with the inlet port 110. In some embodiments, the inlet diameter "D1" of the inlet port 110 may be different from the inner diameter of the end port of the inlet pipe 104.

The exhaust inlet 106 may further include a first portion 202 connecting the exhaust inlet 106 with the inlet pipe 104 and a second portion 204 connecting the exhaust inlet 106 with the canister 114. In the illustrated embodiment, the first portion 202 has an inner diameter "D2" that remains constant throughout a length of the first portion 202. In one embodiment, the inner diameter "D2" may be equal to the inlet diameter "D1" of the inlet port 110. In some embodiments, the inner diameter "D2" may be different from the inlet diameter "D1" of the inlet port 110. The second portion 204 of the exhaust inlet 106 may have an inner diameter "D3" greater than the inner diameter "D2" of the first portion 202. Also, the inner diameter "D3" of the second portion 204 may be greater than a canister diameter "D4" of the canister 114 and the inlet diameter "D1" of the first portion 202 may be less than the canister diameter "D4" of the canister 114. For example, the inlet diameter "D1" of the inlet port 110 may be about 4 inches to 5 inches and the canister diameter "D4" of the canister 114 may be approximately 14 inches. In some embodiments, the inner diameter "D3" of the second portion 202 may be equal to the canister diameter "D4" of the canister 114.

The exhaust inlet 106 may further include a tapered portion 206 extending between the first portion 202 and the second portion 204. More specifically, the tapered portion 206 of the exhaust inlet 106 is disposed between the first portion 202 connecting a first end 208 of the tapered portion 206 to the inlet port 110 and the second portion 204 connecting a second end 210 of the tapered portion 206 to the canister 114. In the illustrated embodiment, the tapered portion 206 has a conical shape. Owing to the conical shape of the tapered portion 206, an inner diameter of the tapered portion 206 may increase proportionally from the first end 208 of the tapered portion 206 to the second end 210 of the tapered portion 206. Accordingly, the second portion 204 of the exhaust inlet 106 has the inner diameter "D3" which may be greater than the inner diameter 'D2' of the first portion 202. The conical shape of the tapered portion 206 may connect the inlet port 110 to the exhaust substrate 118 and aids in maintaining uniform flow of the exhaust mixture introduced into the exhaust inlet 106.

The exhaust aftertreatment system 102 may further include a diffuser 212 arranged within the tapered portion 206 of the exhaust inlet 106. The diffuser 212 is disposed within the tapered portion 206 to maintain the uniform flow of the exhaust mixture therethrough. The diffuser 212 may further include a curved plate 214 arranged within the tapered portion 206 of the metallic body 108 of the exhaust inlet 106 in order to improve the uniform flow of the exhaust mixture. The curved plate 214 may have a curved surface 216 that is convex toward an inlet surface 218 the canister 114. Owing to such an arrangement, the curved plate 214 forms a wall between the first portion 202 and the second portion 204 of the exhaust inlet 106, as shown in FIG. 2. In the preferred embodiment, the curved plate 214 can be manufactured from stamped sheet metal or cast steel and can be welded to the tapered portion 206 of the exhaust inlet 106 to form a single integrated structure. In some implementations, the curved plate 214 and the exhaust inlet 106 can be manufactured together through a casting process as a single component. In another embodiment, the curved plate 214 may be manufactured using any material that is able to withstand the high temperature generated in the exhaust aftertreatment system 102. In another embodiment, the curved plate 214 may be fastened to the tapered portion 206 of the exhaust inlet 106 using fasteners such as bolts and nuts. The curved plate 214 is, hereinafter, interchangeably referred to as the "diffuser plate 214."

A plurality of perforations 222 may be defined in the curved surface 216 of the diffuser plate 214. The plurality of perforations 222 in the diffuser plate 214 may be formed to distribute a portion of the exhaust mixture radially outward across the inlet surface 218 of the canister 114 based on the curved surface 216 of the diffuser plate 214. Construction of the diffuser plate 214 and the plurality of perforations 210 in the diffuser plate 214 are explained in detail with respect to FIG. 3 and FIG. 4 herein below.

The exhaust aftertreatment system 102 may further include the canister 114 disposed downstream of the inlet port 110. The canister 114 is coupled to the second portion 204 of the exhaust inlet 106 at a distance "D" from the inlet port 110 of the exhaust aftertreatment system 102. In one embodiment, the canister 114 may be fastened to the second portion 204 using fasteners such as bolts and nuts. In another embodiment, the canister 114 may be welded to the second portion 204. The distance "D" from the inlet port 110 to the inlet surface 218 of the canister 114 is defined based on a difference between the inner diameter "D2" of the first portion 202, the canister diameter "D4" of the canister 114, and an amount of dispersion produced by the exhaust mixture while passing through the plurality of perforations 222 defined in the diffuser plate 214.

The canister 114 may further include the outlet 122 distal to the inlet surface 218. Each of the inlet surface 218 and the outlet 122 may have multiple perforations defined therein to allow flow of the exhaust mixture therethrough. The exhaust mixture may further pass through the exhaust substrate 118 disposed within the canister 114 and exit through the multiple perforations defined in the outlet 122 of the canister 114. Upon receipt of the exhaust mixture, the exhaust substrate 118 may treat the emission compounds from the exhaust mixture.

In one embodiment, the exhaust substrate 118 may be a Diesel Oxidation Catalyst (DOC). In another embodiment, the exhaust substrate 118 may be a Diesel Particulate Filter (DPF), a Selective Catalytic Reduction (SCR) apparatus, an Ammonia Oxidation Catalyst (AMOX), or any other suitable exhaust substrate 118. In yet another embodiment, the DOC and the DPF may be arranged within the canister 114. In yet another embodiment, the DOC and the DPF may be arranged within separate canisters. Although the present disclosure is described with respect to the exhaust aftertreatment system 102 having the canister 114, it will be understood that the present disclosure may be applicable for the exhaust aftertreatment system 102 having more than one canister.

The exhaust aftertreatment system 102 may further include the exhaust outlet 120. In the illustrated embodiment, the exhaust outlet 120 may be connected to the outlet 122 of the canister 114. Further, the outlet pipe 126 of the exhaust outlet 120 may be bent toward the exhaust inlet 106 resulting in the outlet port 124 facing the curved surface 216 of the diffuser plate 214. As such, the outlet pipe 126 may have a "cobra" shape. In another embodiment, the outlet pipe 126 can have any other shape, such as an axial shape or a radial shape. In some embodiments, the exhaust outlet 120 may be connected to the outlet 122 of the canister 114. Owing to the multiple perforations defined in the outlet 122 of the canister 114, the treated exhaust mixture passes toward the exhaust outlet 120. The exhaust outlet 120 may discharge the treated exhaust mixture from the exhaust substrate 118 to the atmosphere via the outlet port 124. In one embodiment, the exhaust outlet 120 can be coupled to the outlet 122 of the canister 114 via fasteners, such as nuts and bolts. In another embodiment, the exhaust outlet 120 can be welded to the outlet 122 of the canister 114.

Figure 3:
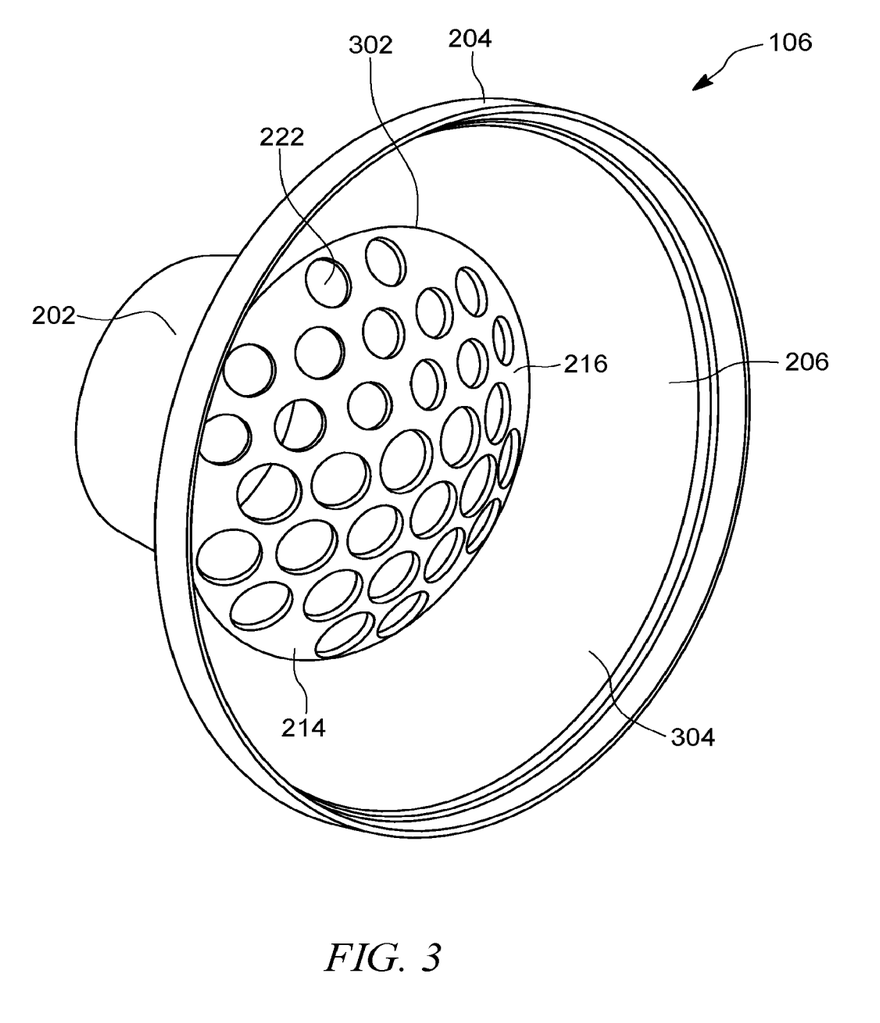
FIG. 3 is a perspective view of an exhaust inlet of the exhaust aftertreatment system according to one or more embodiments of the present disclosure.

Referring to FIG. 3, a perspective view of the exhaust inlet 106, according to one or more embodiments of the present disclosure, is illustrated. The diffuser plate 214 having the plurality of perforations 222 may be coupled to the tapered portion 206 of the exhaust inlet 106. The diffuser plate 214 may have an outer diameter defined by an annular periphery 302 thereof. The outer diameter may be defined based on a location of the diffuser plate 214 within the tapered portion 206 of the exhaust inlet 106. More specifically, the outer diameter of the diffuser plate 214 may be defined based on a distance from the inlet port 110, at which the diffuser plate 214 may be coupled, to an inner surface 304 of the tapered portion 206 of the exhaust inlet 106. In one embodiment, the annular periphery 302 of the diffuser plate 214 may be welded to the inner surface 304 of the tapered portion 206 of the exhaust inlet 106. In some implementations, the curved plate 214 and the exhaust inlet 106 can be manufactured together through a casting process as a single component. In an alternative embodiment, the annular periphery 302 of the diffuser plate 214 may be fastened to the inner surface 304 of the tapered portion 206 using fasteners such as bolts and nuts. In some embodiments, the diffuser plate 214 may be press fitted with the inner surface 304 of the tapered portion 206.

The plurality of perforations 222 may be defined throughout the curved surface 216 of the diffuser plate 214. The plurality of perforations 222 distributes the portion of the exhaust mixture radially outward across the inlet surface 218 of the canister 114 based on the curved surface 216 of the diffuser plate 214. Further, the curved surface 216 of the diffuser plate 214 facilitates distribution of the exhaust mixture along the inner surface 304 of the tapered portion 206 of the exhaust inlet 106 and then to then inlet surface 218 of the canister 114. In one embodiment, the plurality of perforations 222 may be arranged in an asymmetric pattern on the curved surface 216 of the diffuser plate 214. The asymmetric pattern of the plurality of perforations 222 is described in detail with respect to FIG. 4.

Figure 4:
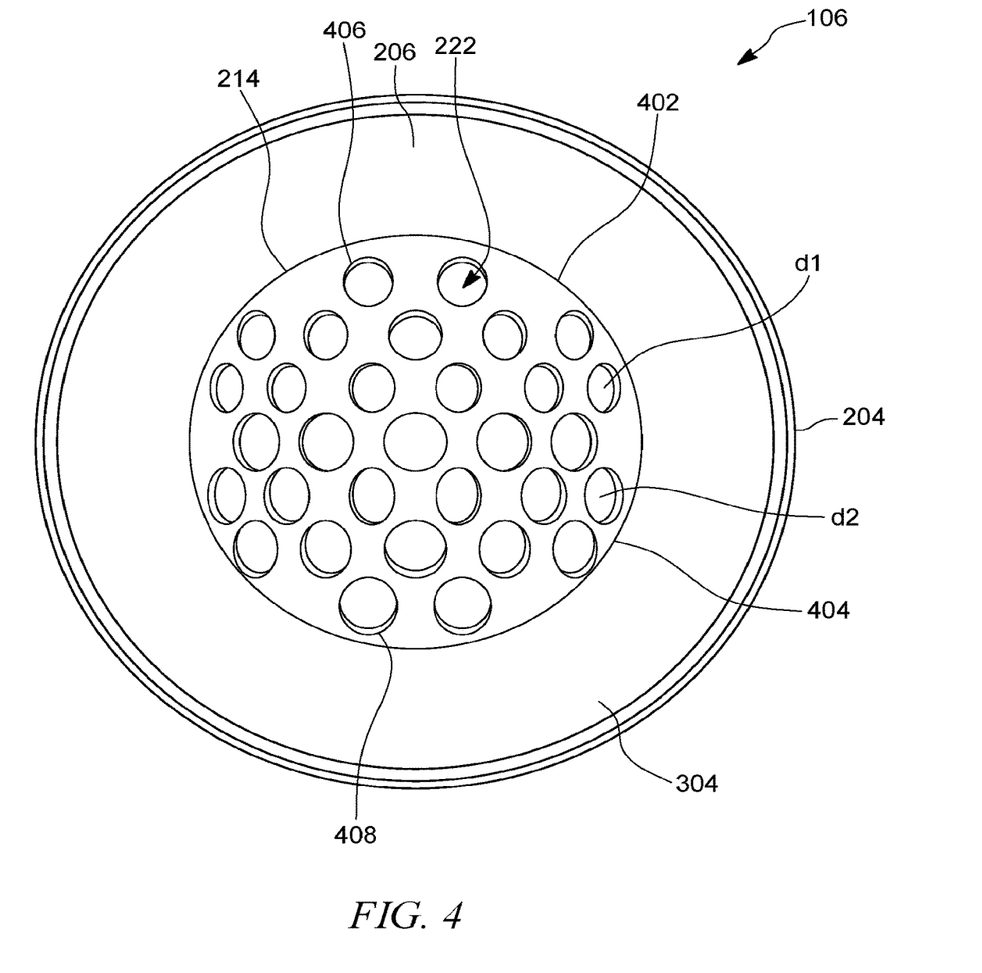
FIG. 4 is a planar view of the exhaust inlet of FIG. 3 according to one or more embodiments of the present disclosure.

The FIG. 4 illustrates a planar view of the exhaust inlet 106 of FIG. 1 showing the asymmetric pattern of the plurality of perforations 222 according to one or more embodiments of the present disclosure. The diffuser plate 214 may include a first hemisphere 402 and a second hemisphere 404. In one embodiment, a surface area of the first hemisphere 402 may be less than a surface area of the second hemisphere 404. In another embodiment, the surface area of the first hemisphere 402 may be greater than the surface area of the second hemisphere 404. In yet another embodiment, the surface area of the first hemisphere 402 may be equal to the surface area of the second hemisphere 404.

The asymmetric pattern of the plurality of perforations 222 may further include a first set of perforations 404 and a second set of perforations 408. More specifically, the first set of perforations 404 may be defined in the first hemisphere 402 of the diffuser plate 214. Similarly, the second set of perforations 408 may be defined in the second hemisphere 404 of the diffuser plate 214. Each of the first set of perforations 404 may have a first diameter "d1" and each of the second set of perforations 408 may have a second diameter "d2". In one embodiment, the first diameter 'd1' of the first set of perforations 404 may be less than the second diameter 'd2' of the second set of perforations 408. In another embodiment, the first diameter 'd1' of the first set of perforations 404 may be equal to the second diameter 'd2' of the second set of perforations 408. In some embodiments, the first diameter 'd1' of the first set of perforations 404 may be greater than the second diameter 'd2' of the second set of perforations 408. In some embodiments, the plurality of perforations 222 may have three or more sets of unequal diameters.

In an embodiment, the diffuser plate 214 may be disposed within the tapered portion 206 in such a way that the first set of perforations 404 having the first diameter 'd1' may be closer to the outlet port 124 of the exhaust outlet 120 and the second set of perforations 408 having the second diameter 'd2' may be further away from the outlet port 124 than the first set of perforations 404. Further, the first diameter "d1" of the first set of perforations 404 and the second diameter "d2" of the second set of perforations 408 may be defined based on a flow rate at which the exhaust mixture may be allowed to flow toward the canister 114 and a backpressure of the exhaust mixture that may be caused within the exhaust aftertreatment system 102.

Owing to the asymmetric pattern of the plurality of perforations 222, as depicted in the FIG. 3 and FIG. 4, the exhaust mixture may be uniformly distributed across the inlet surface 218 of the canister 114 and a surface 226 (shown in FIG. 2) of the exhaust substrate 118. Although the present disclosure is explained with reference to the asymmetric pattern of the plurality of perforations 222, as illustrated in FIG. 3 and FIG. 4, it will be understood that the asymmetric pattern of the plurality of perforations 222 may vary based on various parameters of the exhaust aftertreatment system 102, such as a size of the canister 114, location of the exhaust substrate 118, location and shape of the exhaust outlet 120, and configuration of the outlet pipe 126, without limiting the scope of the present disclosure.

In addition to the asymmetric pattern of the plurality of perforations 222, an amount of curvature of the diffuser plate 214, a number of perforations 222 defined on the diffuser plate 214 and the first and second diameters "d1," "d2" of each of the plurality of perforations 222 may aid in maintaining the uniform flow of the exhaust mixture. The amount of curvature of the diffuser plate 214, a number of perforations 222 defined on the diffuser plate 214 and the first and second diameters "d1," "d2" of each of the plurality of perforations 222 may be determined based on an amount of backpressure generated at the diffuser plate 214 downstream of the inlet port 110. In one embodiment, the amount of curvature of the diffuser plate 214 and the number of perforations 222 defined on the diffuser plate 214 may be designed in such a way that the amount of backpressure generated downstream of the inlet port 110 may be less than a predetermined threshold pressure. The predetermined threshold pressure may be determined based on a lab test and simulation.

Figure 5:
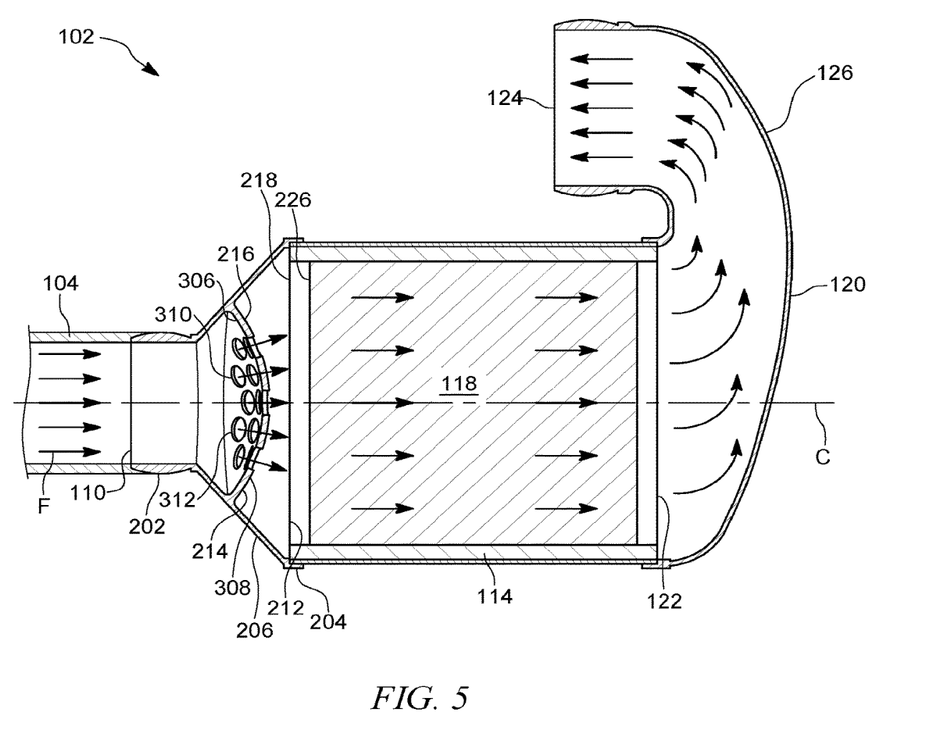
FIG. 5 is a cross-sectional view of the exhaust aftertreatment system of FIG. 2 depicting flow paths of exhaust mixture through the curved plate and an exhaust substrate according to one or more embodiments of the present disclosure.

FIG. 5 illustrates a cross-sectional view of the exhaust aftertreatment system 102 depicting flow path "F" of the exhaust mixture via the inlet port 110 and the diffuser plate 214. During operation of the engine 100, the exhaust mixture may be introduced into the exhaust aftertreatment system 102 at the inlet port 110 via the inlet pipe 104. In the illustrated embodiment, the inlet pipe 104 may be a straight pipe disposed horizontally and connected to the exhaust manifold of the engine 100 and the inlet port 110 may be coaxial with a central axis "C" of the exhaust aftertreatment system 102. The exhaust mixture enters the tapered portion 206 of the exhaust inlet 106 through the inlet port 110 and the first portion 202. Owing to the conical shape of the tapered portion 206 of the exhaust inlet 106, the flow of the exhaust mixture may be expanded prior to being introduced to the diffuser plate 214. Further, the conical shape of the tapered portion 206 may facilitate smooth expansion of the flow of exhaust mixture without creating any turbulence in the flow of exhaust mixture before being introduced to the diffuser plate 214.

The curved surface 216 of the diffuser plate 214 and the plurality of perforations 222 defined on the diffuser plate 214 may facilitate distribution of the portion of the exhaust mixture substantially uniformly across the inlet surface 218 of the canister 114. In an embodiment, some portion of the exhaust mixture may pass through the first set of perforations 404 defined in the first hemisphere 402 of the diffuser plate 214. Similarly, some portion of the exhaust mixture may pass through the second set of perforations 408 defined in the second hemisphere 404 of the diffuser plate 214. As the first diameter "d1" of the first set of perforations 404 is smaller than the second diameter "d2" of the second set of perforations 408, less amount of exhaust mixture may pass through the first set of perforations 404 compared to the second set of perforations 408. Such difference in flow rate of the exhaust mixture may prevent back pressure at the exhaust outlet 120 as the outlet pipe 126 is bent toward the first hemisphere 402 of the diffuser plate 214 and the outlet port 124 facing toward the curved surface 216 of the diffuser plate 214. Although, the flow rate at which the exhaust mixture flowing through the canister 114 may be different, the exhaust mixture may be distributed substantially uniformly across the inlet surface 218 of the canister 114. Due to the plurality of perforations 222 defined on the inlet surface 218 of the canister 114, the exhaust mixture may be further introduced into the exhaust substrate 118.

The exhaust substrate 118 may further reduce the emission compounds present in the exhaust mixture. For example, in the case of a DPF, as the exhaust mixture passes through the exhaust substrate 118, particulate matter contained in the exhaust mixture may be trapped and prevented from being emitted to the atmosphere. The treated exhaust mixture may further pass via the plurality of perforations 222 defined in the outlet 122 of the canister 114 to the exhaust outlet 120 of the exhaust aftertreatment system 102. The treated exhaust mixture may further flow through the outlet pipe 126 and may be discharged into the atmosphere through the outlet port 124.

Figure 6:
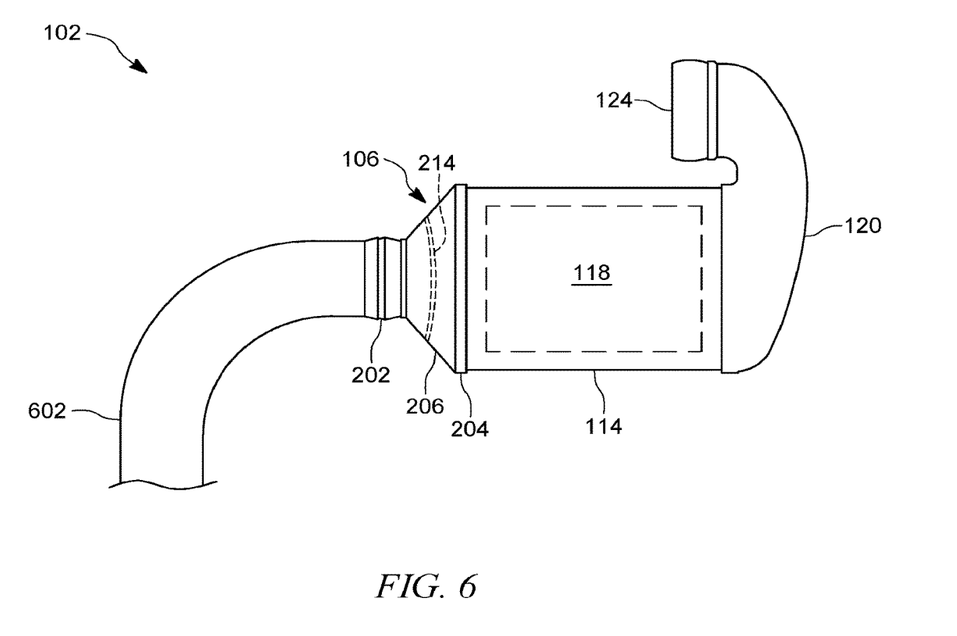
FIG. 6 is a side view of the exhaust aftertreatment system showing connection of an inlet pipe to an inlet port of the exhaust inlet according to one or more embodiments of the present disclosure.

FIG. 6 illustrates a side view of the exhaust aftertreatment system 102 showing a connection of an inlet pipe 602 to the exhaust aftertreatment system 102 according to one or more embodiments of the present disclosure. The inlet pipe 602 connecting the exhaust manifold of the engine 100 and the exhaust aftertreatment system 102 may be arranged in various orientations based on a space within an engine compartment to accommodate the exhaust aftertreatment system 102, size and shape of the exhaust aftertreatment system 102, and an application of the engine 100. In an embodiment, the inlet pipe 602 connecting the exhaust manifold of the engine 100 to the inlet port 110 can be bent at 90 degrees, as illustrated in FIG. 6. Due to such L-shape of the inlet pipe 104, a flow of the exhaust mixture from the exhaust manifold to the inlet port 110 may be altered as the exhaust mixture may be pushed to an outer side of the bend of the inlet pipe 602 causing turbulence in the flow of the exhaust mixture while flowing through the inlet pipe 602. However, the first portion 202 and the tapered portion 206 of the exhaust inlet 106 may bring uniformity to such non-uniform flow of the exhaust mixture before being introduced to the diffuser plate 214.

Subsequently, the uniform flow of the exhaust mixture may be introduced to the diffuser plate 214. The amount of curvature of the diffuser plate 214, the number of plurality of perforations 222 disposed on the diffuser plate 214, and the first and second diameters "d2," "d2" of the plurality of perforations 222 may further aid in maintaining the uniform flow of the exhaust mixture irrespective of the configuration or orientation of the inlet pipe 602. The exhaust mixture flowing through the diffuser plate 214 may thereafter substantially uniformly distributed across the inlet surface 218 of the canister 114 irrespective of the configuration or the orientation of the inlet pipe 602 connected to the inlet port 110 of the exhaust inlet 106.

INDUSTRIAL APPLICABILITY

The present disclosure relates to the exhaust inlet 106 of the exhaust aftertreatment system 102 and the diffuser plate 214 disposed within the tapered portion 206 of the exhaust inlet 106. The exhaust aftertreatment system 102 having the exhaust inlet 106 may be used with any engine where the distance 'D' (shown in FIG. 2) between the inlet port 104 and the canister 114 of the exhaust substrate 118 have to be minimum. The tapered portion 206 of the exhaust inlet 106, the amount of the curvature of the diffuser plate 214, and the asymmetric pattern of the plurality of perforations 222 defined in the curved plate 214 may aid in maintaining the uniform flow of the exhaust mixture prior to being dispersed to the inlet surface 218 of the canister 114. Due to a compact construction of the exhaust inlet 106, space within the engine compartment may be optimized. In addition, development cost of the exhaust inlet 106 of the exhaust aftertreatment system 102 can be reduced. Further, the curved surface 216 of the diffuser plate 214 that is convex toward the canister 114 causes expansion of the flow of the exhaust mixture across a cross section of the canister 114 as compared to an expansion of the flow of exhaust mixture caused by a flat diffuser plate. Further, the plurality of perforations 222 defined on the diffuser plate 214 may be greater in number than a plurality of perforations defined on a flat diffuser plate. As such, an amount of backpressure that may be generated at the diffuser plate 214 downstream of the inlet port 110 may be comparatively less than an amount of backpressure generated on the flat diffuser plate. The exhaust inlet 106, the diffuser plate 214, and the exhaust outlet 120 are hereinafter referred to as "the exhaust component 106," "the curved plate 214," and "the outlet component 120," respectively.

Figure 7:
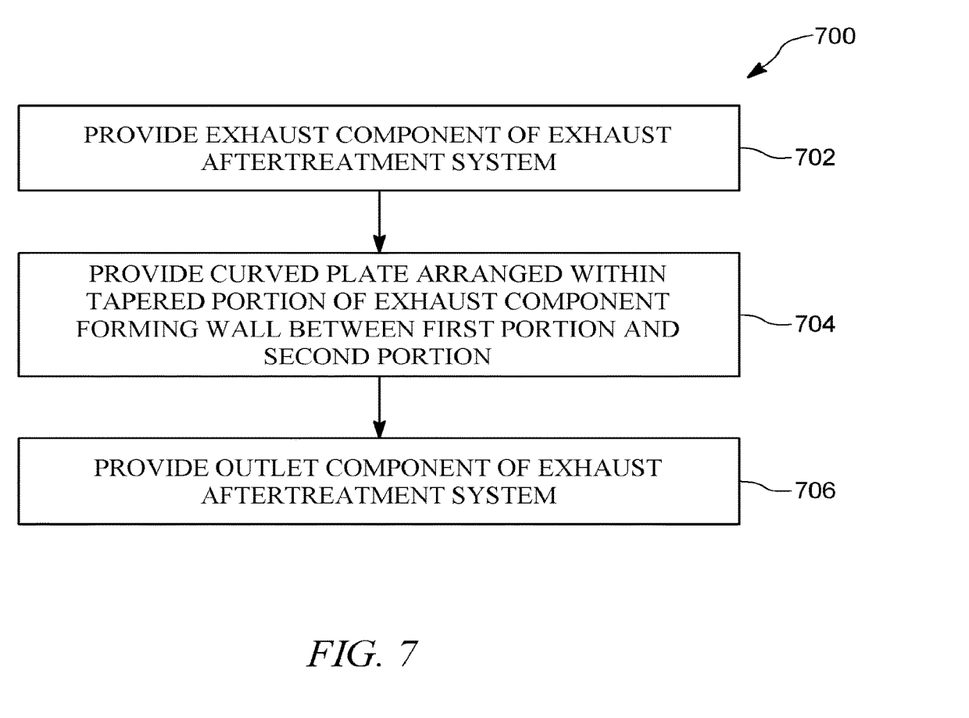
FIG. 7 is a flow chart of a method for uniformly distributing the exhaust mixture across a cross section of the exhaust substrate of the exhaust aftertreatment system according to one or more embodiments of the present disclosure.

FIG. 7 illustrates a flow chart of a method 700 for uniformly distributing the exhaust mixture across a cross-section of the exhaust substrate 118 of the exhaust aftertreatment system 102 according to one or more embodiments of the present disclosure. At step 702, the method 700 can include providing the exhaust component 106 of the exhaust aftertreatment system 102. The exhaust component 106 may have the first portion 202, the second portion 204 and the tapered portion 206 disposed between the first portion 202 and the second portion 204. More specifically, the tapered portion 206 is disposed between the first portion 202 connecting the tapered portion 206 to the inlet port 110 and the second portion 204 connecting the tapered portion 206 to the canister 114. The exhaust component 106 receives the exhaust mixture from the engine 100 through the inlet pipe 104 connected between the exhaust manifold of the engine 100 and the inlet port 110 of the exhaust component 106.

At step 704, the method 700 can include providing the curved plate 214. The curved plate 214 may be arranged within the tapered portion 206 of the exhaust component 106 and form the wall between the first portion 202 and the second portion 204. The curved plate 214 may be convex toward the canister 114. More specifically, the curved plate 214 may be convex and facing toward the inlet surface 218 of the canister 114. The curved plate 214 may include the plurality of perforations 222 defined on the curved plate 214 through which the exhaust mixture may flow from the inlet port 110 to the exhaust substrate 118 disposed within the canister 114. The plurality of perforations 222 may facilitate distribution of the exhaust mixture across the surface 226 of the exhaust substrate 118. More specifically, the curved plate 214 and the plurality of perforations 222 may facilitate substantial and uniform distribution of the exhaust mixture across the surface 226 of the exhaust substrate 118 based on the asymmetric pattern of the plurality of perforations 222 defined in the curved plate 214.

At step 706, the method 700 can include providing the outlet component 120 of the exhaust aftertreatment system 102. The outlet component 120 may include the outlet pipe 126 having the outlet port 124 defined distal from the outlet 122 of the canister 114 and facing toward the curved plate 214 of the exhaust component 106. The outlet port 124 may discharge the treated exhaust mixture to the atmosphere.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An exhaust aftertreatment system comprising:
   an exhaust inlet configured to receive an exhaust mixture through an inlet port, the exhaust inlet including a tapered portion between a first portion connecting the tapered portion to the inlet port and a second portion connecting the tapered portion to a canister of an exhaust substrate;
   a diffuser arranged within the tapered portion of the exhaust inlet including a diffuser plate forming a wall between the first portion and the second portion having a curved surface that is convex toward an inlet surface of the canister of the exhaust substrate and a plurality of perforations disposed in the curved surface of the diffuser plate through which the exhaust mixture is allowed to pass from the inlet port to the exhaust substrate,
   wherein the plurality of perforations distributes a portion of the exhaust mixture radially outward across the inlet surface of the canister of the exhaust substrate based on curved surface of the diffuser plate; and
   an exhaust outlet connected to an outlet of the canister of the exhaust substrate configured to discharge a treated exhaust mixture from the exhaust substrate through an outlet port,
   wherein the exhaust outlet includes an outlet pipe bent toward the exhaust inlet resulting in the outlet port facing the curved surface of the diffuser plate,
   wherein the curved surface has a radius of curvature with respect to a given point, wherein each of the plurality of the perforations has a center and extends through the diffuser plate along an orientation axis extending between the given point and the center, wherein the plurality of perforations includes a first set of perforations having a first diameter and a second set of perforations having a second diameter, wherein the first diameter of the first set of perforations is less than the second diameter of the second set of perforations, and wherein the first set of perforations having the first diameter is closer to the outlet port, and wherein the second set of perforations having the second diameter is further away from the outlet port than the first set of perforations.

2. The exhaust aftertreatment system of claim 1, wherein an inlet diameter of the inlet port is less than a canister diameter of the canister of the exhaust substrate.

3. The exhaust aftertreatment system of claim 2, wherein a distance from the inlet port to the inlet surface of the canister of the exhaust substrate is based on a difference between the inlet diameter and the canister diameter and an amount of dispersion produced by the exhaust mixture passing through the plurality of perforations disposed on the diffuser plate.

4. The exhaust aftertreatment system of claim 1, wherein the tapered portion of the exhaust inlet has a conical shape connecting the inlet port to the exhaust substrate.

5. The exhaust aftertreatment system of claim 1, wherein the second portion of the exhaust inlet has a diameter greater than a diameter of the first portion and the tapered portion.

6. The exhaust aftertreatment system of claim 1, wherein the exhaust substrate is a Diesel Oxidation Catalyst (DOC).

7. The exhaust aftertreatment system of claim 1, wherein the exhaust substrate is a Diesel Particulate Filter (DPF), a Selective Catalytic Reduction (SCR) apparatus, or an Ammonia Oxidation Catalyst (AMOX).

8. The exhaust aftertreatment system of claim 1, wherein the plurality of perforations are arranged in an asymmetric pattern on the curved surface of the diffuser plate.

9. The exhaust aftertreatment system of claim 8, wherein the asymmetric pattern includes a first hemisphere and a second hemisphere, wherein a surface area of the first hemisphere is less than a surface area of the second hemisphere.

10. The exhaust aftertreatment system of claim 1, wherein the outlet pipe has an axial shape or a radial shape.

11. An exhaust aftertreatment system comprising:
an exhaust inlet configured to receive an exhaust mixture through an inlet port, the exhaust inlet including a tapered portion between a first portion connecting the tapered portion to the inlet port and a second portion connecting the tapered portion to a canister of an exhaust substrate;
a diffuser arranged within the tapered portion of the exhaust inlet including a diffuser plate forming a wall between the first portion and the second portion having a curved surface that is convex toward an inlet surface of the canister of the exhaust substrate and a plurality of perforations disposed in the curved surface of the diffuser plate through which the exhaust mixture is allowed to pass from the inlet port to the exhaust substrate,
wherein the plurality of perforations distributes a portion of the exhaust mixture radially outward across the inlet surface of the canister of the exhaust substrate based on curved surface of the diffuser plate; and
an exhaust outlet connected to an outlet of the canister of the exhaust substrate configured to discharge a treated exhaust mixture from the exhaust substrate through an outlet port,
wherein the plurality of perforations includes a first set of perforations having a first diameter and a second set of perforations having a second diameter, wherein the first diameter of the first set of perforations is less than the second diameter of the second set of perforations, and
wherein the first set of perforations having the first diameter is closer to the outlet port, and wherein the second set of perforations having the second diameter is further away from the outlet port than the first set of perforations.

12. The exhaust aftertreatment system of claim 1, wherein the plurality of perforations and the curved surface distribute the portion of the exhaust mixture substantially uniformly across the inlet surface of the canister of the exhaust substrate.

13. The exhaust aftertreatment system of claim 1, wherein the exhaust mixture flowing through the diffuser plate is distributed substantially uniformly across the inlet surface of the canister of the exhaust substrate independent of a configuration or orientation of an inlet pipe connected to the inlet port of the exhaust substrate.

14. A component of an exhaust aftertreatment system comprising:
a metallic body having a tapered portion; and
a curved plate arranged within the tapered portion of the metallic body having a plurality of perforations disposed on the curved plate,
wherein the plurality of perforations on the curved plate facilitates distribution of an exhaust mixture flowing through the curved plate across a surface of a substrate,
wherein the curved plate has a radius of curvature with respect to a given point, and
wherein each of the plurality of the perforations has a center and extends through the curved plate along an orientation axis extending between the given point and the center,
wherein the plurality of perforations includes a first set of perforations having a first diameter and a second set of perforations having a second diameter, wherein the first diameter of the first set of perforations is less than the second diameter of the second set of perforations, and
wherein the first set of perforations having the first diameter is closer to the outlet port, and wherein the second set of perforations having the second diameter is further away from the outlet port than the first set of perforations.

15. The component of claim 14, wherein the metallic body and the curved plate are welded or cast together as a single component.

* * * * *